(12) United States Patent
Sutton

(10) Patent No.: US 8,205,717 B2
(45) Date of Patent: Jun. 26, 2012

(54) VEHICLE LADDER MOUNTING SYSTEM

(76) Inventor: Jeffery Wayne Sutton, Oklahoma City, OK (US)

( * ) Notice: Subject to any disclaimer, the term of this patent is extended or adjusted under 35 U.S.C. 154(b) by 1278 days.

(21) Appl. No.: 11/691,450

(22) Filed: Mar. 26, 2007

(65) Prior Publication Data
US 2007/0221444 A1 Sep. 27, 2007

Related U.S. Application Data

(60) Provisional application No. 60/743,778, filed on Mar. 25, 2006.

(51) Int. Cl.
*E06C 5/00* (2006.01)
(52) U.S. Cl. ........................................................ 182/127
(58) Field of Classification Search .................... 182/127
See application file for complete search history.

(56) References Cited

U.S. PATENT DOCUMENTS 5,768,966 A * 6/1998 Duginske ...................... 83/468.7
5,921,603 A * 7/1999 Karrer ............................ 296/39.2

OTHER PUBLICATIONS http://www.tracrac.com/.
http://www.kargomaster.com/.
http://www.truckaddons.com.

* cited by examiner

*Primary Examiner* — Alvin Chin Shue
(74) *Attorney, Agent, or Firm* — Martin S. High, P.C.

(57) ABSTRACT

The instant invention, the Vehicle Ladder Mounting System, is comprised of a rail assembly, a plurality of support assemblies, one or more security assemblies, and one or more accessory assemblies. The rail assembly of the instant invention is comprised of two parallel rails connected by a plurality of cross-member assemblies. The instant invention can be easily adapted, augmented, and modified because of the structure of the aluminum channel. The design of the instant invention allows for multiple configurations as the rail can be attached to the punched pattern in many configurations via a bolt-nut combination. The instant invention is also comprised of assemblies that can be used to stack ladders on a vehicle. The instant invention is also comprised of an inclined ladder rack assembly and accessory attachments such as the shovel holders, beacon support, and inclined beacon support.

5 Claims, 25 Drawing Sheets

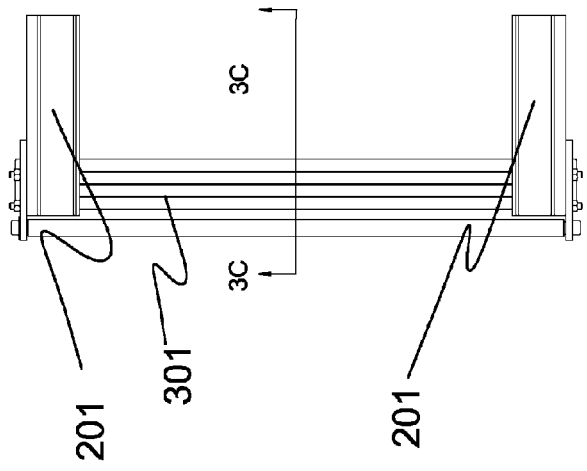
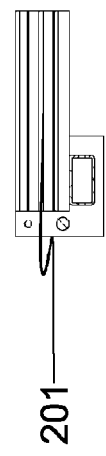
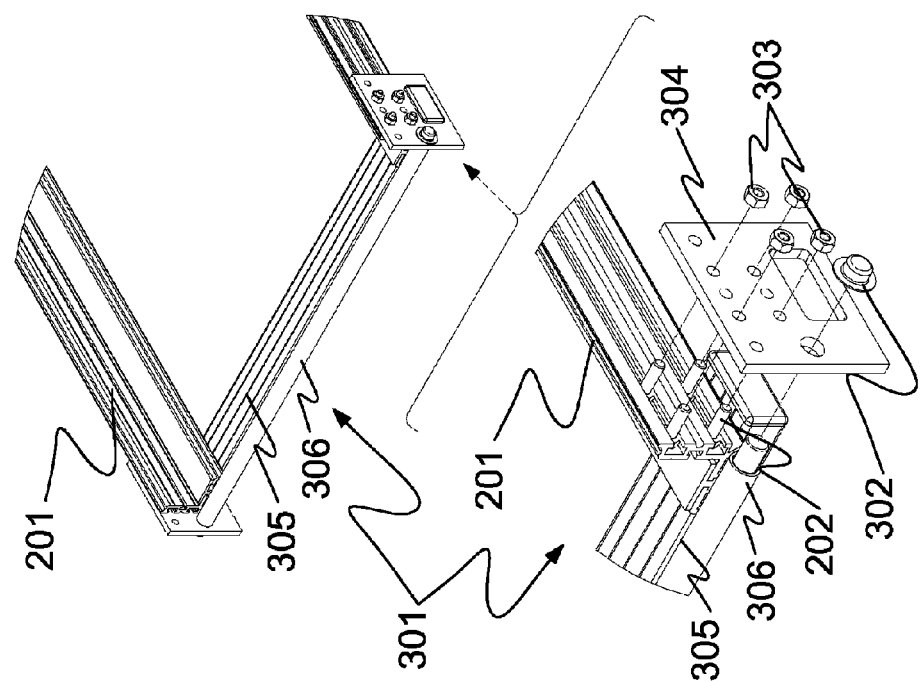
FIG 3b
FIG 3c
FIG 3a

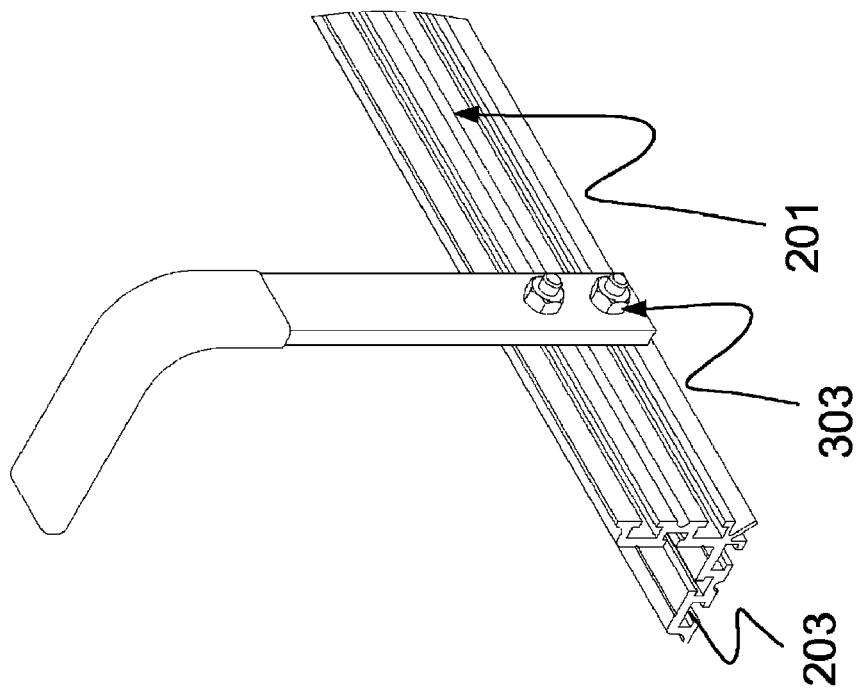
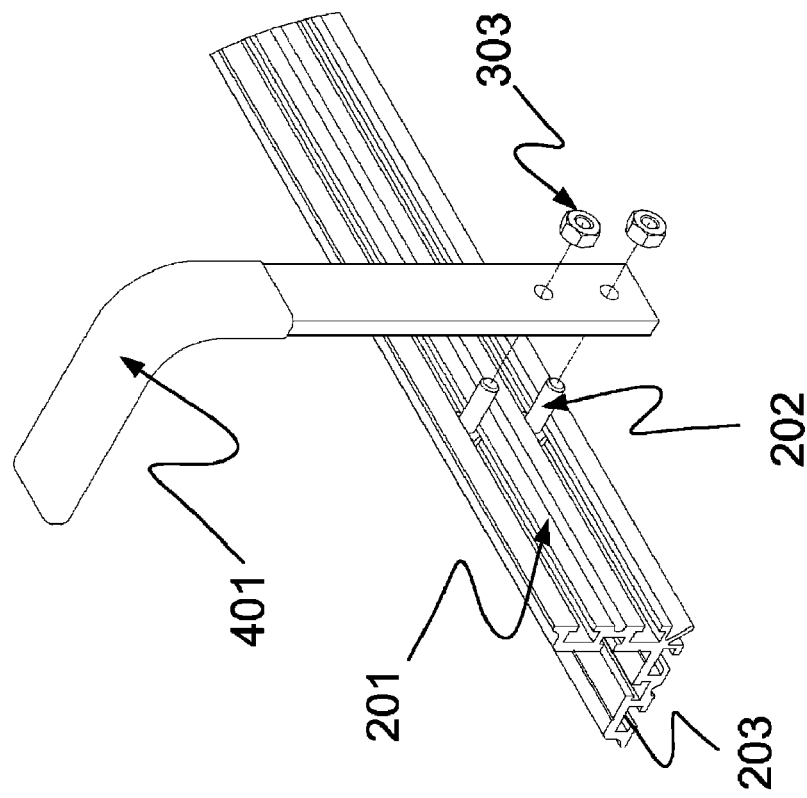
FIG 4b
FIG 4a

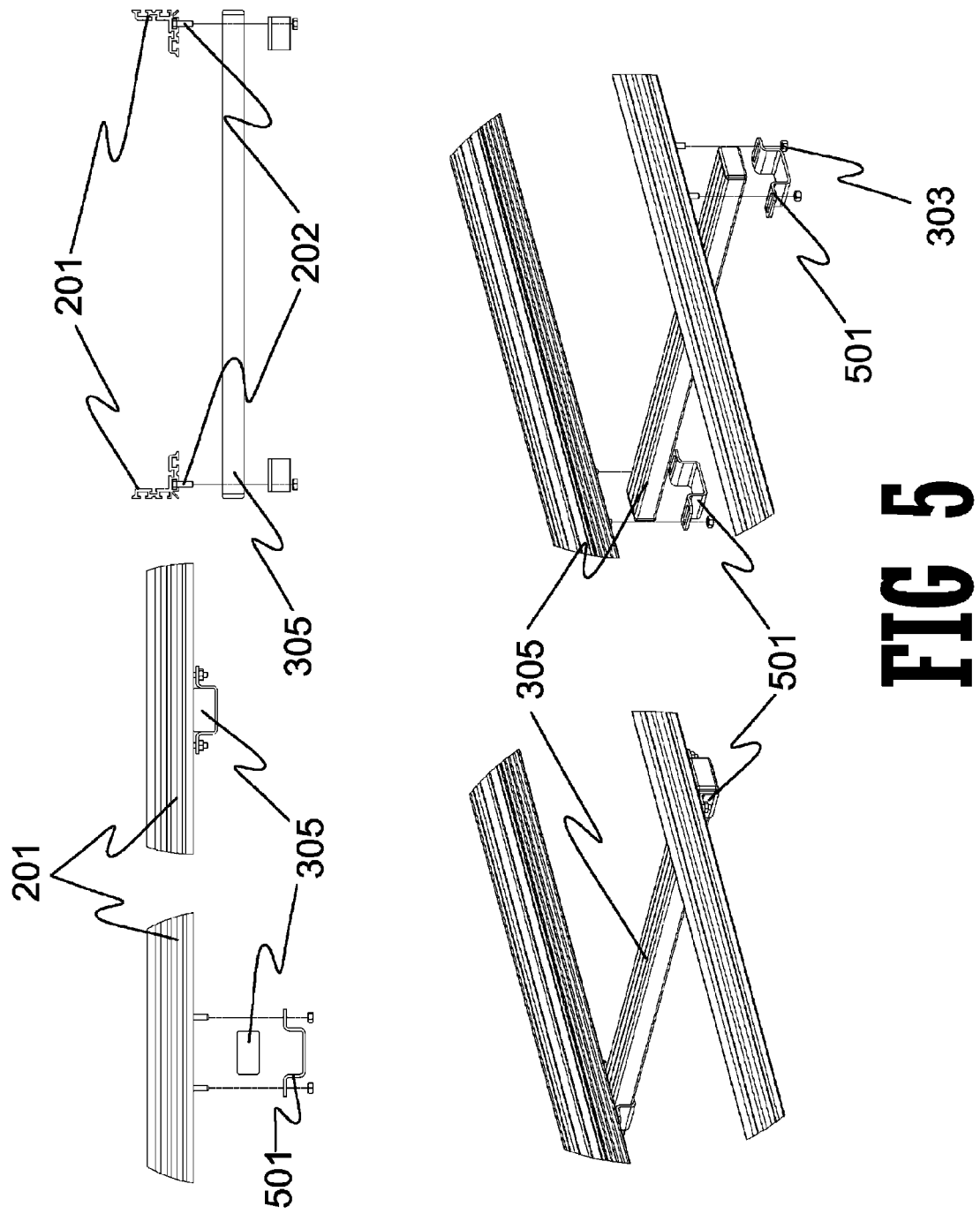

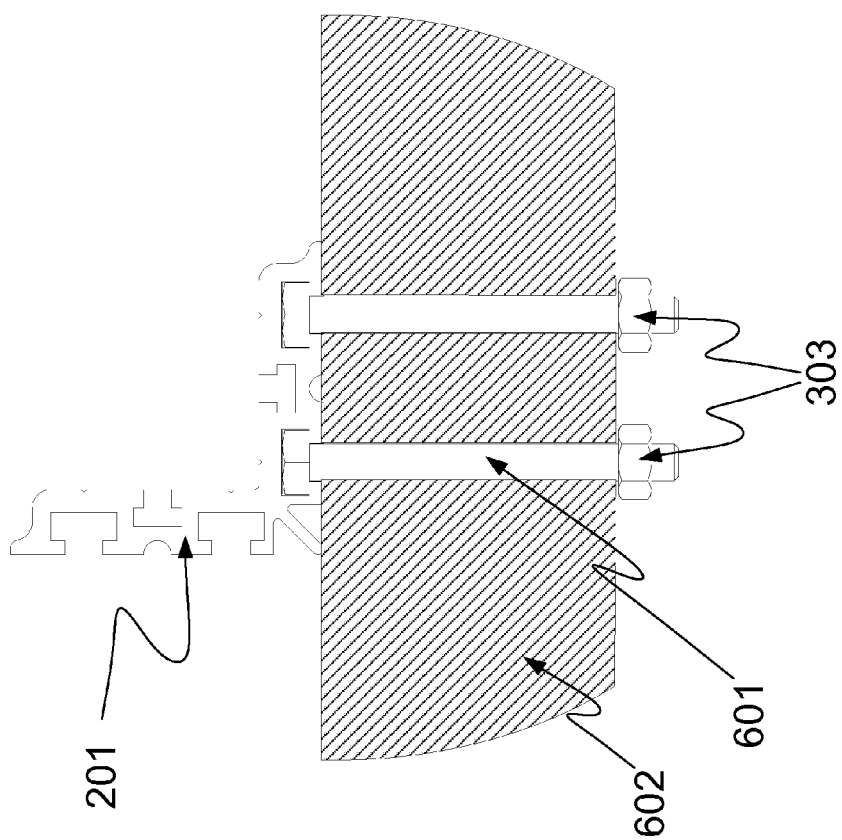

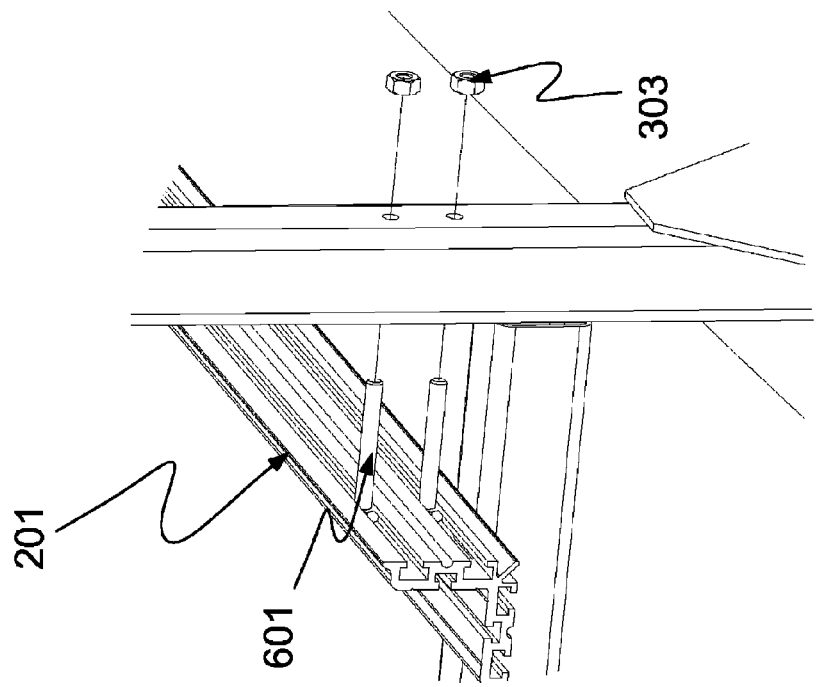
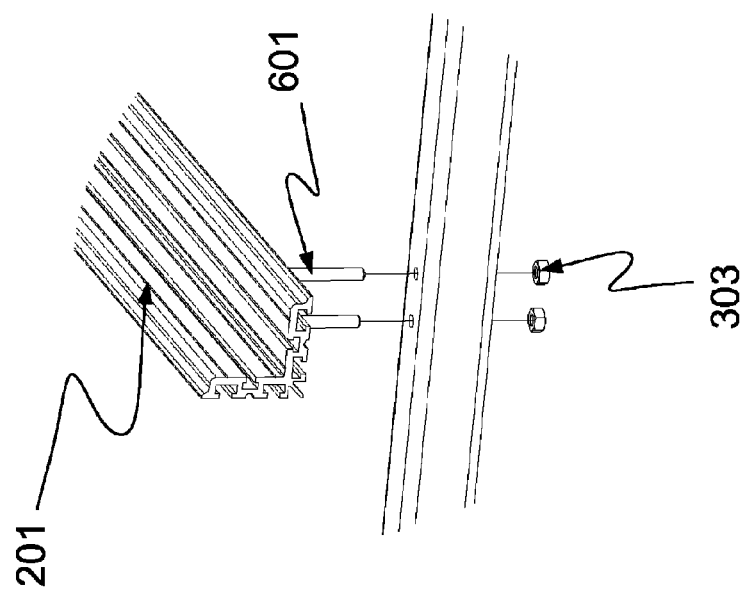
FIG 7b
FIG 7a

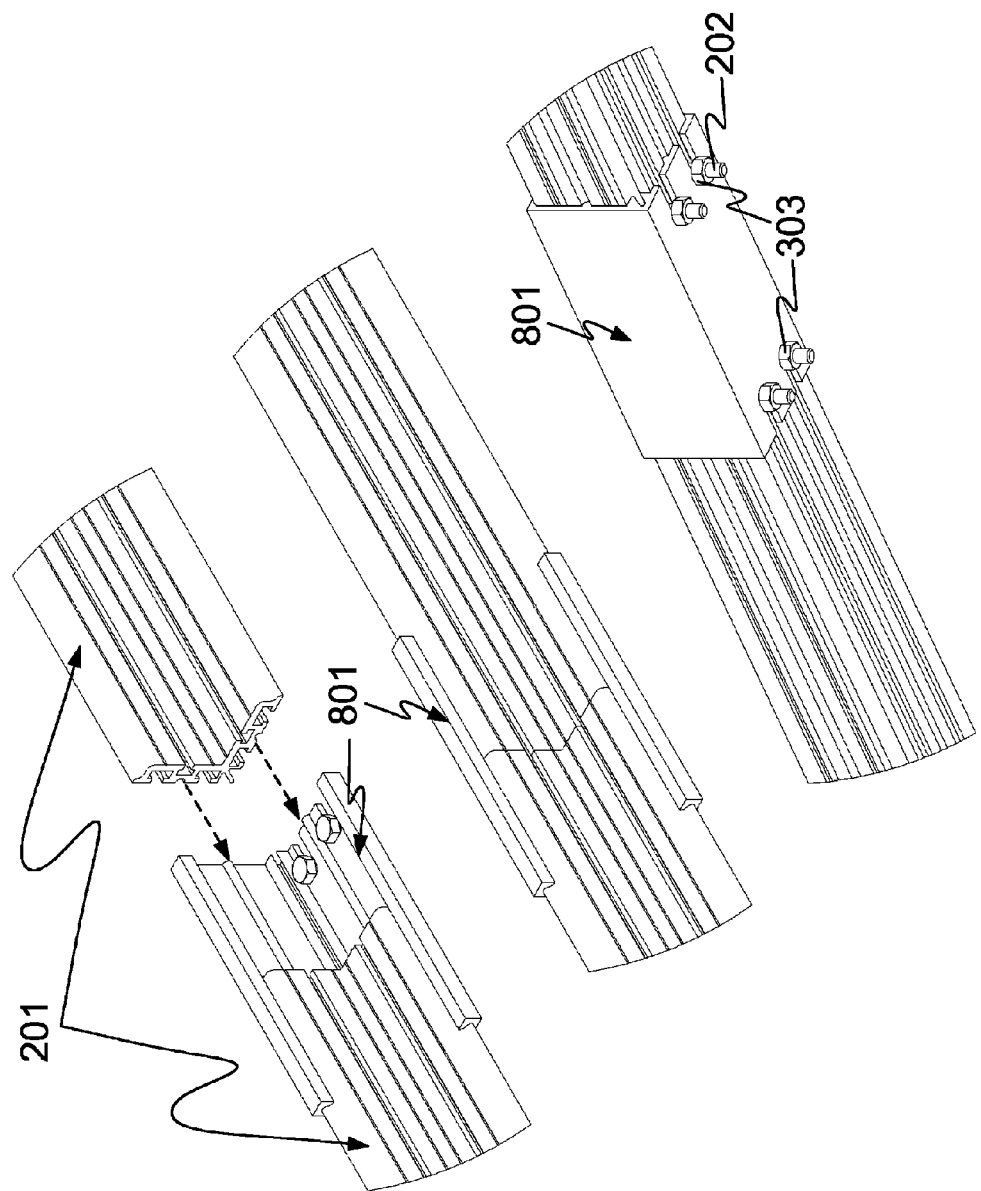

VEHICLE LADDER MOUNTING SYSTEM

CROSS-REFERENCE TO RELATED APPLICATIONS

This application claims the benefit of U.S. Provisional Application No. 60/743,778, filed on Mar. 25, 2006. U.S. Provisional Patent Application No. 60/743,778 is incorporated by reference in its entirety for all purposes as if fully set forth herein.

STATEMENT REGARDING FEDERALLY SPONSORED RESEARCH OR DEVELOPMENT

Not applicable.

REFERENCE TO A "SEQUENCE LISTING," A TABLE, OR A COMPUTER PROGRAM LISTING

Not applicable.

BACKGROUND OF THE INVENTION

1. Field of Invention

The field of the instant invention, the Vehicle Ladder Mounting System, generally involves the support of objects on top of vehicles and more specifically the support of ladders and other equipment on vehicles.

2. Description of Prior Art

The prior art involves the support means mounted to the bed or sides of vans, pickup or utility trucks for ladders and accessories. The support means can be as rudimentary as a bracket mounted to the truck which in turns clamps to the ladder thereby supporting the ladder on the truck. The support means can also consist of a metal frame installed onto the truck bed.

There are many drawbacks to the current state of the art in ladder support devices. Most significantly, current inventions do not allow for any modifications of the arrangement of the various support means and can not be installed on ladder supports from different manufacturers. When modifications are possible, these modifications are typically very difficult to accomplish. The current state of the art does not allow for a wide variety of configurations. Further, current inventions do not allow for the easy attachment of accessories to the support devices. The instant invention addresses these concerns.

BRIEF SUMMARY OF THE INVENTION

The instant invention, the Vehicle Ladder Mounting System, is comprised of a rail assembly, a plurality of support assemblies, one or more security assemblies, and one or more accessory assemblies. The rail assembly of the instant invention is comprised of one rail or two parallel rails connected by a plurality of cross-member assemblies. The instant invention also comprises a rail design that allows for a wide variety of configurations to be made due to the plurality of square channels formed by the rails. The rails allow for flexible installation on a variety of surfaces and vehicles. The quad-channel rails in particular allow for highly flexible assembly of a variety of configurations. The instant invention can be easily adapted, augmented, and modified because of the structure of the aluminum channel. The design of the instant invention allows for multiple configurations as the rail can be attached to the punched pattern in many configurations via a bolt-nut combination. Therefore, due to the flexibility of the rails nearly limitless configurations can be constructed.

This description, and the detailed description below, is not intended to limit the number of configurations taught by this invention as the system to make these easily configurable arrangements is the invention described herein, not merely the various configurations posed as examples.

One preferred embodiment of the invention is comprised of cross-member assemblies. The cross-member assemblies are comprised of a cross-members, a roller, and two side flanges. The side flanges can be attached via a nut-and-bolt configuration or can be welded to the cross-members.

Depending on the application requirements of the instant invention, various configurations as various preferred embodiments of support assemblies and security assemblies may be used. Security assemblies are used to secure the ladder to the instant invention. Various preferred embodiments comprise assemblies that can be used to stack ladders on a vehicle. Another preferred embodiment of the instant invention, an inclined ladder rack assembly is comprised of accessory attachments including, but not limited to, shovel holders, beacon supports, and inclined beacon supports.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be used as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

BRIEF DESCRIPTION OF THE SEVERAL VIEWS OF THE DRAWING

FIG. 3a is a perspective view of the assembly of a rail assembly using the quad-channel embodiment of the rail. FIG. 3b shows the rail assembly using the quad-channel embodiment of the rail from the top. FIG. 3c shows the rail assembly using the quad-channel embodiment of the rail from the side.

FIG. 4 shows the attachment of accessories, a support "L," to the quad-channel embodiment of the rail. FIG. 4a is an exploded view of the attachment of the support "L." FIG. 4b is a perspective view showing the support "L" attached.

FIG. 5 shows a perspective view of the attachment a cross-member bracket to the quad-channel embodiment of the rail in order to install a cross-member for construction of a ladder rack assembly.

FIG. 6 illustrates a cross-sectional view illustrating the attachment of the quad-channel embodiment of the rail to any generic object.

FIG. 7 shows a perspective view illustrating the attachment of the quad-channel embodiment of the rail to rail or beam to a generic horizontal object. FIG. 7a shows a horizontal attachment and FIG. 7b illustrates a vertical attachment to a generic horizontal object.

FIG. 8 shows a perspective view of the use of a quad-channel union that is used to join two sections of quad-channel rail.

DETAILED DESCRIPTION OF THE INVENTION

The instant invention, the Vehicle Ladder Mounting System, 100 is comprised of a rail assembly, a plurality of support assemblies, one or more security assemblies, and one or more accessory assemblies.

The rail assembly of the instant invention is comprised of one rail 201 or two parallel rails 201 connected by a plurality of cross-member assemblies 301. A rail 201 is broadly defined as a long, narrow member that can be fabricated with a variety of cross sections and from a variety of metallic materials. In a preferred embodiment, the parallel rails 201 are manufactured of aluminum. The rail 201 is comprised of smaller sub-channels with a variety of shapes that run the length of the rail. These sub-channels are formed by the long, narrow rail. The rail assembly is constructed such that the right angles face each other. See FIG. 3. That is the rails are oriented such that the when viewed on end, the rails form a mirror image of each other with the lower side of each "L" pointing towards the center of the rail assembly.

In one preferred embodiment of the instant invention, the parallel rails are comprised of a rail 201 which is an elongated member with an essentially "L" shaped cross section. In this preferred embodiment, the rail 201 forms a plurality of small channels with a rectangular 203 or square cross section that run the length of the rail. These channels with rectangular 203 or square cross-section significantly enhance the adaptability of the instant invention.

Figure 1:
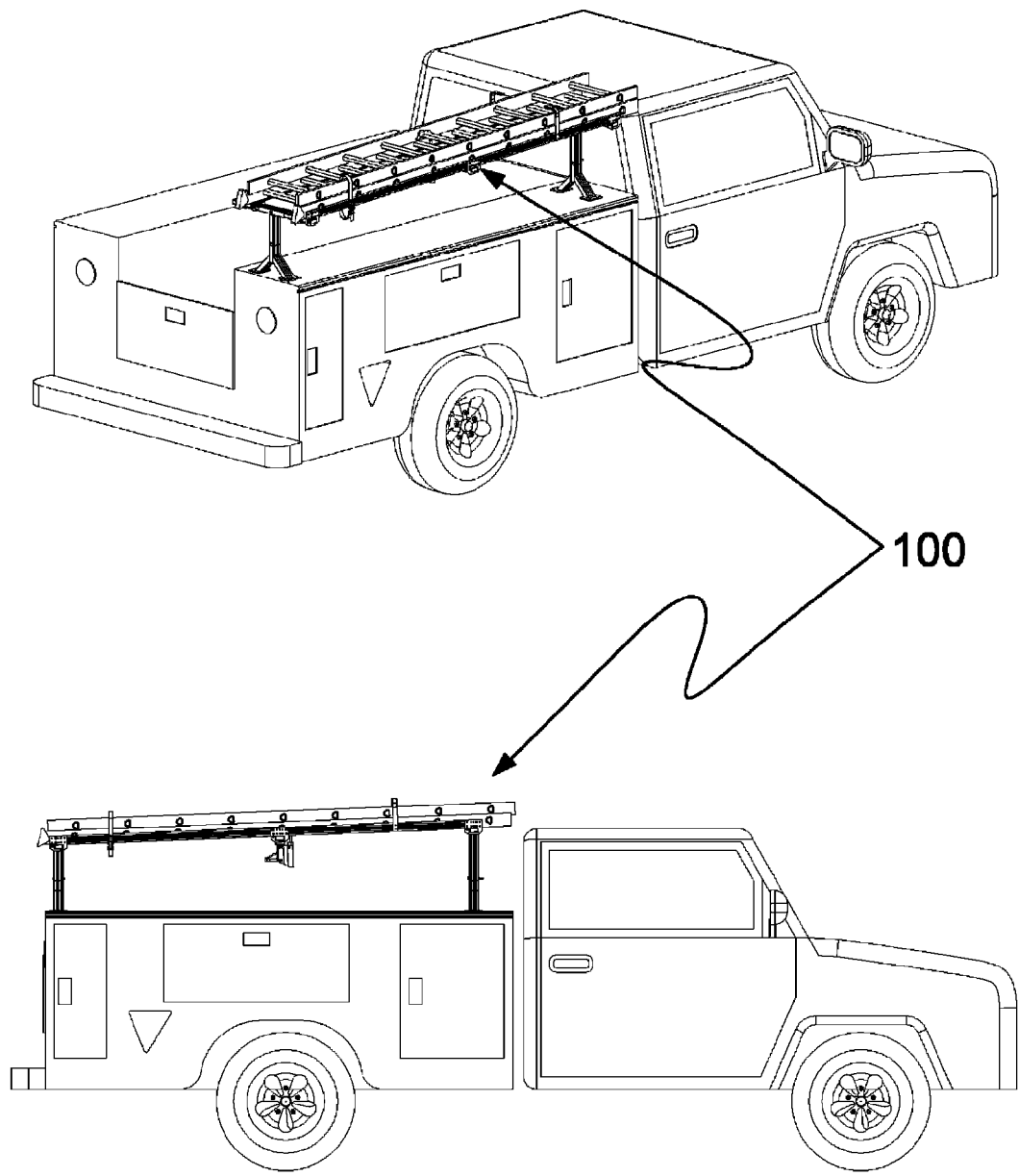
FIG. 1 is a perspective and side view of the inclined embodiment of ladder mounting system mounted onto a utility truck.
Figure 2:
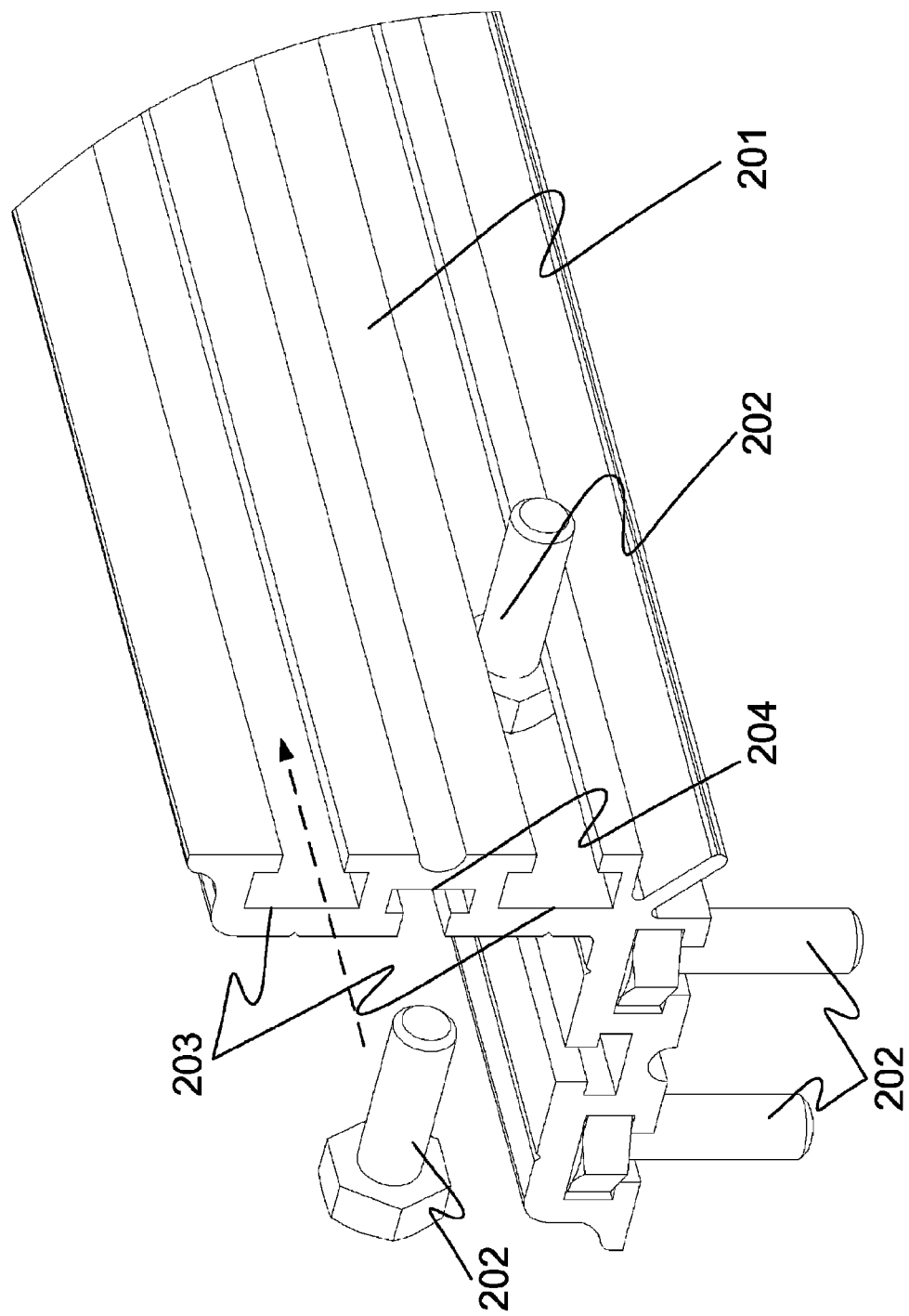
FIG. 2 is a perspective view of one embodiment of the rail used in the rail assembly showing the quad-channel embodiment. This figure also illustrates how a plurality bolts can be inserted into and arranged along the channels of the rails.

In one preferred embodiment of the instant invention, a plurality of square or rectangular channels 203 is formed along the length of the rails wherein the channels are formed on the outside sides of the "L." See FIG. 2. In other words, the channels are formed on the sides of the "L" that form a reflex angle (an angle greater than 180 degrees) to each other. The interior walls of the rail 201, or those walls that form a right angle, are smooth or ridged to aid the smooth loading of a ladder onto the instant invention. In yet another preferred embodiment of the instant invention, slots or grooves 204 are formed on the interior walls that can accept corresponding slots, grooves or channels of accessories including, but not limited to, an ultra-high molecular weight (UHMW) slip pad.

The square channels can accept the head of a bolt, and the bolt may slide along the length of the rail in the square channel. The head of the bolt is incapable of being removed from the square channel except at the ends of the square channels located at the end of the rails. See FIG. 2. The small channels with a rectangular cross section can accept the head of a bolt by sliding the bolt head from either end of the aluminum channel. Most importantly, the small channels do not allow the bolt to turn as the width of the channel is slightly larger than the size of the bolt head as referenced from one flat surface on the bolt head to the opposing flat surface of the bolt head. The small channels do not allow the bolt head to move perpendicularly to the aluminum channel as the bolt head is restrained by small channel.

In another preferred embodiment, the small channels are formed on all surfaces of the aluminum channel. In this preferred embodiment of the instant invention, the plurality of small channels numbers between 3 and 6 small channels with small channels found on all surfaces of the aluminum surface.

In one preferred embodiment, the rail is comprised of four square channels (see FIG. 2) formed by the aluminum channel which two channels in each side of the "L" of the rail (see FIG. 2). This preferred embodiment of the rail is termed the quad-channel rail. The quad-channel rail is a particularly useful embodiment. The quad-channel embodiment allows for the utmost flexibility in constructing ladder rail assemblies. By sliding bolts 202 along the channels (see FIG. 2) and adjusting the location of the bolts 202 along the channels, unique and custom configurations of rail assemblies can be formed. The quad-channel embodiment also allows for different mounting options for adding onto ladder racks from other manufacturers.

Cross-members 305 can be assembled to quad-channel rails using a cross-member brace plate 304 to form ladder rack assemblies 100. In this embodiment, bolts on the outside of the rail connect directly to the cross-member and this embodiment does not require a punched flange to secure the rail. The cross-member brace plate 304 is secured to the rails 201 (shown as a quad-channel rail in FIG. 3) by securing nuts 303 on the bolts 202 installed in the rectangular 203 or square channels. A cap nut 302 is pressed on to the end of the roller assembly 306 and secures the cross-member brace plate 304 onto the roller assembly. Multiple cross-members 305 can be easily added to a rail configuration using a cross-member bracket 501 and secured with nuts 303 and bolts 202. The bolts 202 are placed along the square or rectangular channels 203 at the appropriate location. See FIG. 5.

Various accessories can be easily installed on the rails by securing through pre-drilled holes in accessories with bolts in the channels and secured by nuts. See FIG. 4. The bolts are positioned in the appropriate location on the channels, the bolts 202 are passed through the pre-drilled holes of the accessory, and the nuts 303 are tightened down.

A rail 201 can be secured to any object 602 that can be pre-drilled and that can accept a bolt through the object. As illustrated in FIG. 6, long bolts 601 can be inserted into the square or rectangular channels and located along the channels are the appropriate location. The bolts are then passed through the pre-drilled holes in the object 602 and secured with nuts 303. In a similar fashion, the rails can be secured to other support structures. See FIGS. 6 and 7.

Rails 201 can be spliced together to form longer rails with a splice joint 801. The splice joint 801 is an essentially "L" shaped aluminum or steel plate formed with grooves to accept the channels and grooves on the rails 201. The splice joint 801 is long enough to provide sufficient support by overlapping the ends of the rails 201 sufficiently to provide support. Bolts 202 are positioned along the rectangular or square channels at the appropriate location. The splice joint 801 is positioned over the joint of two rails 201 and the bolts secured with nuts 303. See FIG. 8. Rails 201 can be easily shortened by cutting the rail with a hacksaw or band saw to length. The splice joint 801 also provides a significant advantage in shipping ladder rack rails as long rails that would be costly to ship can be constructed from shorter pieces of ladder rack rail that are less costly to ship.

Figure 9:
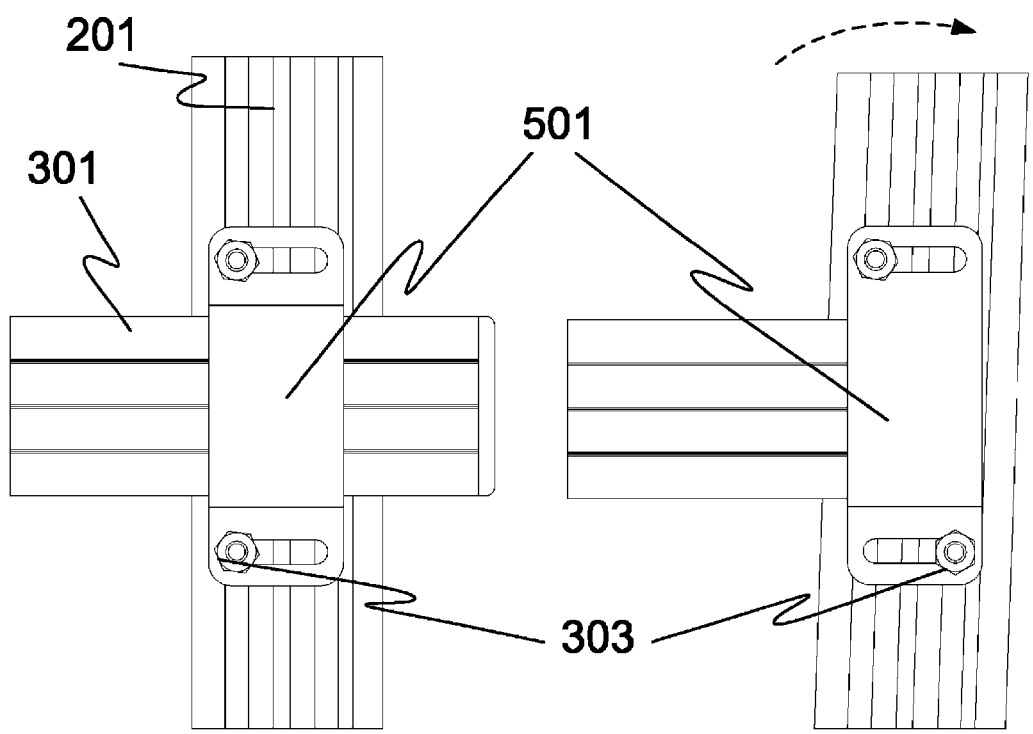
FIG. 9 shows a bottom view of the attachment a cross-member bracket to the quad-channel embodiment of the rail and illustrating how the cross-member bracket may be offset allowing for tapered ladder rack assemblies to accommodate objects with varying widths.
Figure 10:
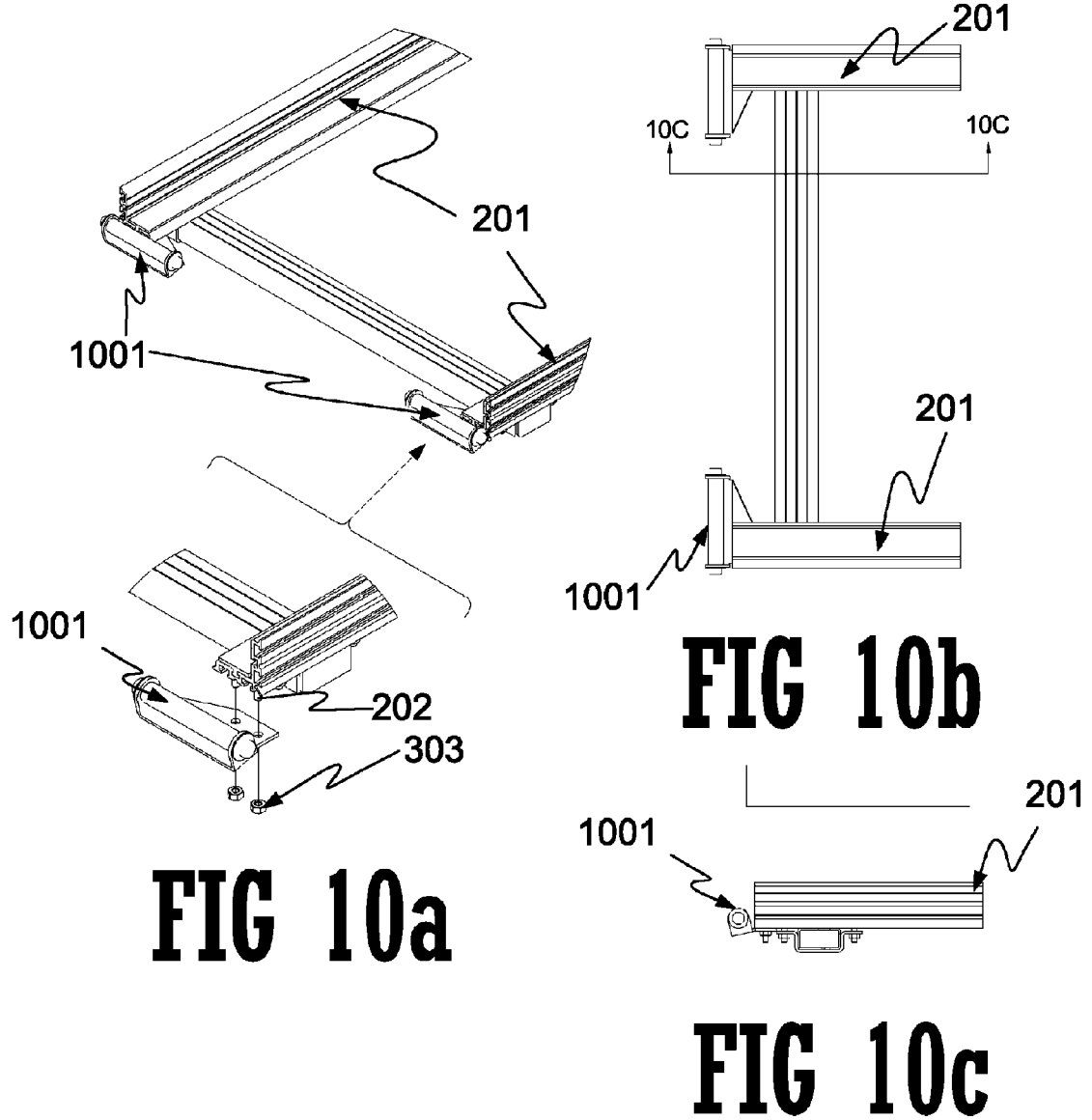
FIG. 10a shows an assembly drawing of a roller assembly to a quad-channel rail.
FIG. 10b shows a top view of a roller assembly attached to a quad-channel rail.
FIG. 10c shows a side view of a roller assembly attached to a quad-channel rail.

A cross-member bracket 501 and a cross-member 301 can be used to provide extra lateral support for a ladder rack assembly. The cross-member bracket 501 is attached to a rail by positioning bolts 202 in the square channels were appropriate and securing the cross-member bracket 501 with nuts 303. A cross-member bracket 501 can also be used instead of a cross-member assembly 301 for constructing a ladder rack assembly. When using a cross-member bracket 501 the slotted hole for the bolts 202 formed by the cross-member bracket 501 is machined to provide enough room for the cross-member 305 to be positioned at an angle slightly off of 90 degrees from the rail 201. See FIG. 9. This off 90 degree angle allows the ladder rack system 100 to form tapered assemblies. These tapered assemblies can be used to support ladders with a taper such as step ladders.

Rollers 1001 can be added to the rails 201 in a manner similar to accessories. Bolts 202 are positioned at the appropriate location along the square or rectangular channels formed by the rail, typically at the end of the rail 201 for installation of a roller 1001. The bolts 202 are inserted through holes in the roller 1001, and the bolts are secured by nuts 303. The rollers 1001 permit easy load-on and load-off of the ladders onto the ladder rack system 100.

Figure 11:
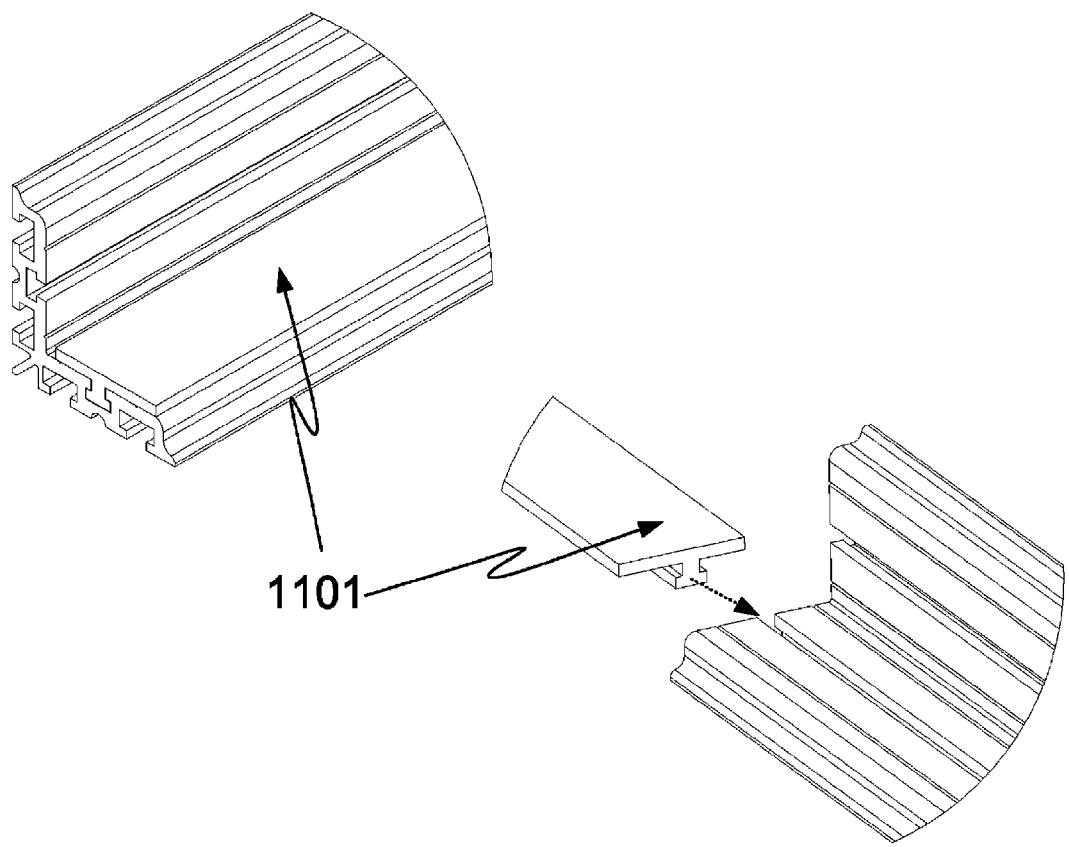
FIG. 11 shows the installation of a UHMW pad into a quad-channel rail and shows how the male slot formed by the UHMW pad is accepted by the female slot of the quad-channel rail.

Ultra High Molecular Weight (UHMW) polymer slip pads 1101 may be installed onto the rails 201 at locations that aid the loading of ladders. The UHMW polymer slip pads 1101 form channels and grooves that accept the appropriate channel and grooves on the ladder rails. See FIG. 11. The UHMW polymer slip pads 1101 may be installed onto a rail 201 and accept the channels and ridges on the rail. The UHMW polymer slip pads can be inserted onto a rail and provide a non-stick surface that allows ladders to more easily slide along the rails 201.

In another preferred embodiment, the rail is comprised of two square channels with two square or rectangular channels formed on one side of the rails. See FIG. 12. In this embodiment, the cross-members are affixed to the cross-member brace plate 304 via a welding means or a punched flange to secure the cross-member to the rail. See FIG. 13. The punched flange is affixed to the cross-member assemblies 301 and is described below.

Figure 12:
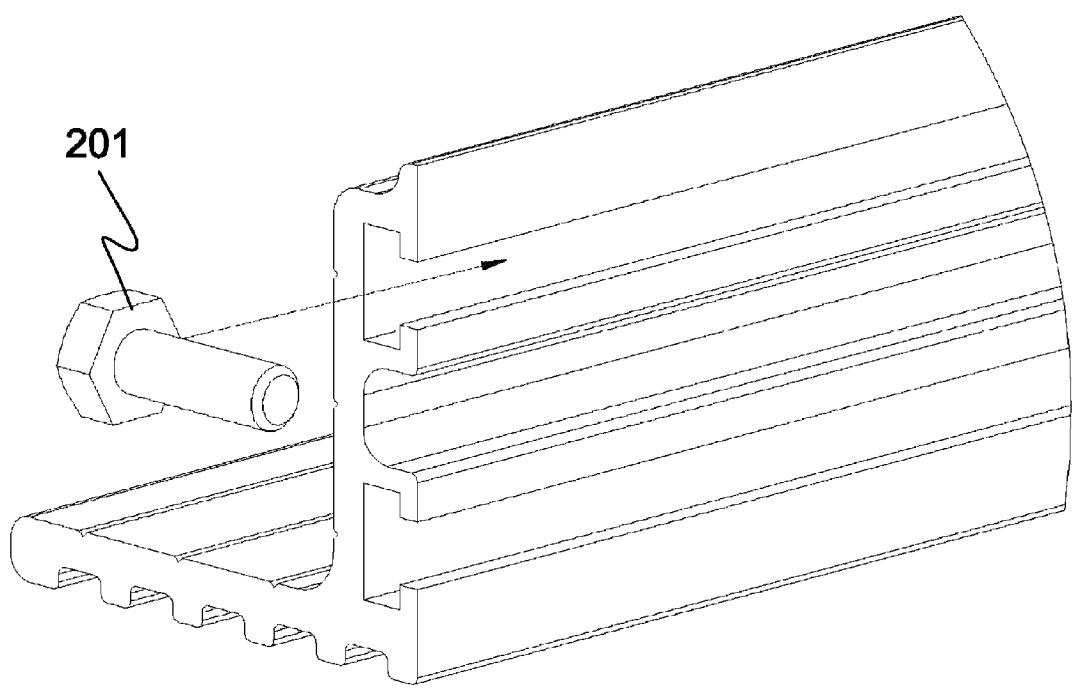
FIG. 12 shows an expanded view of the relationship between the bolts used in the ladder rail support system and the small channels formed by the rail in a dual-channel rail.
Figure 13:
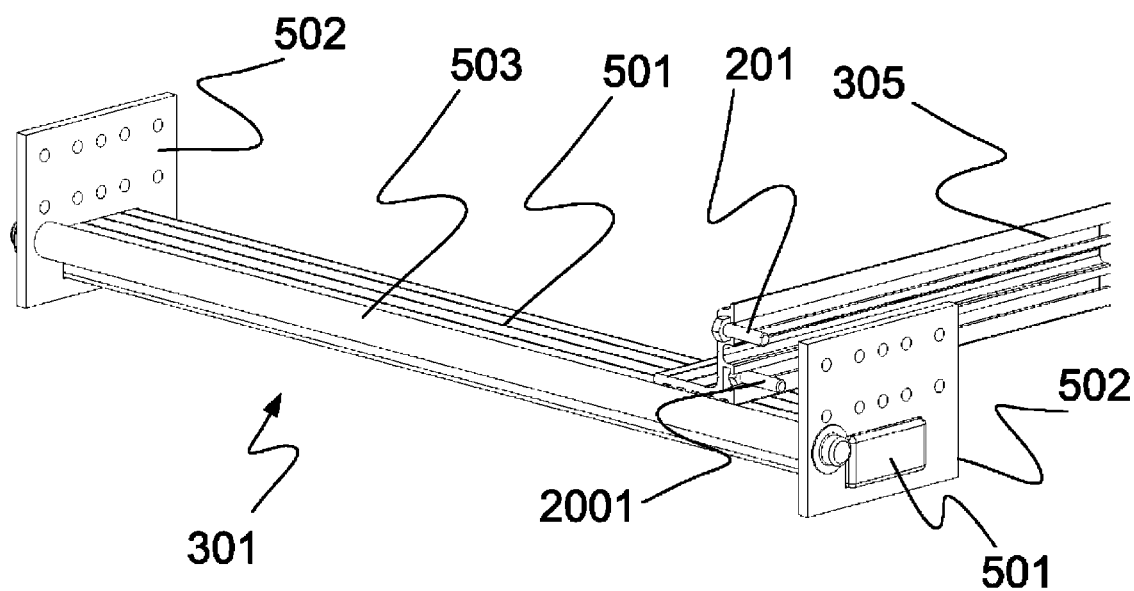
FIG. 13 is a perspective view of one of the crossbar assemblies and its connection to a side rail of the rail assembly of the ladder mounting system in a dual-channel rail system.
Figure 14:
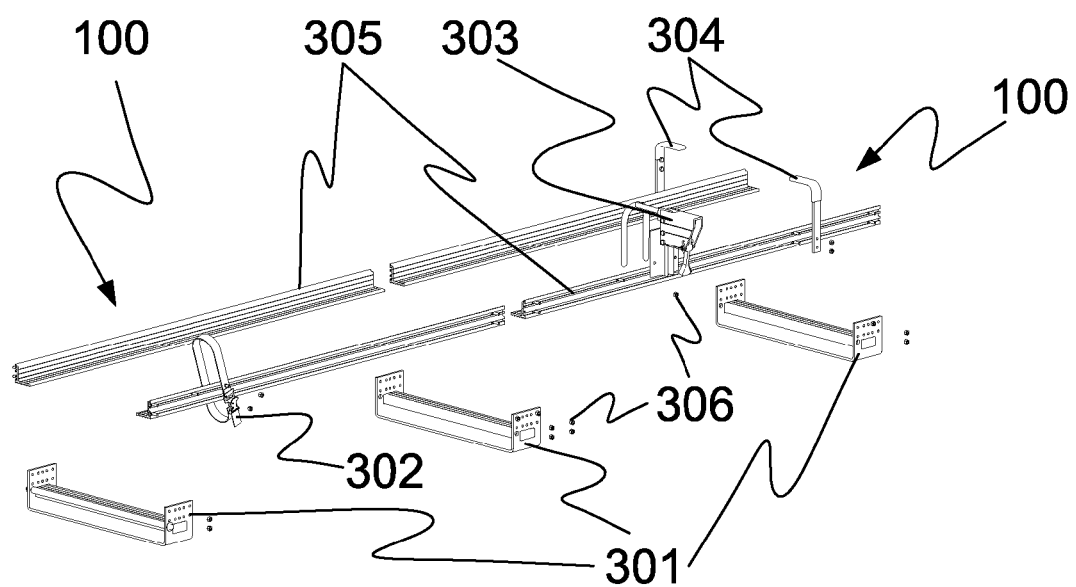
FIG. 14 is an exploded view of the rail assembly of the ladder mounting system in a dual-channel rail system.
Figure 15A:
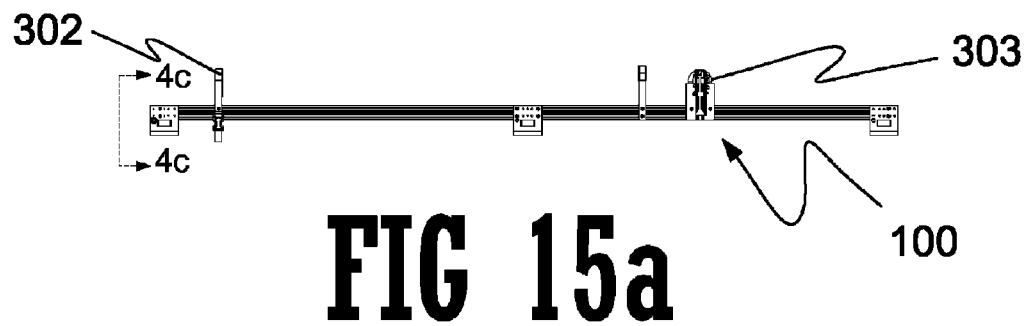
FIG. 15a is a side view of the rail assembly of the ladder mounting system.
Figure 15B:
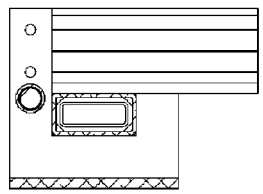
FIG. 15b is a front view of the corner subassembly of the rail assembly of the ladder mounting system.
Figure 15C:
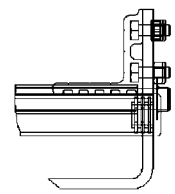
FIG. 15c is a side view of the corner subassembly of the rail assembly of the ladder mounting system.
Figure 15D:
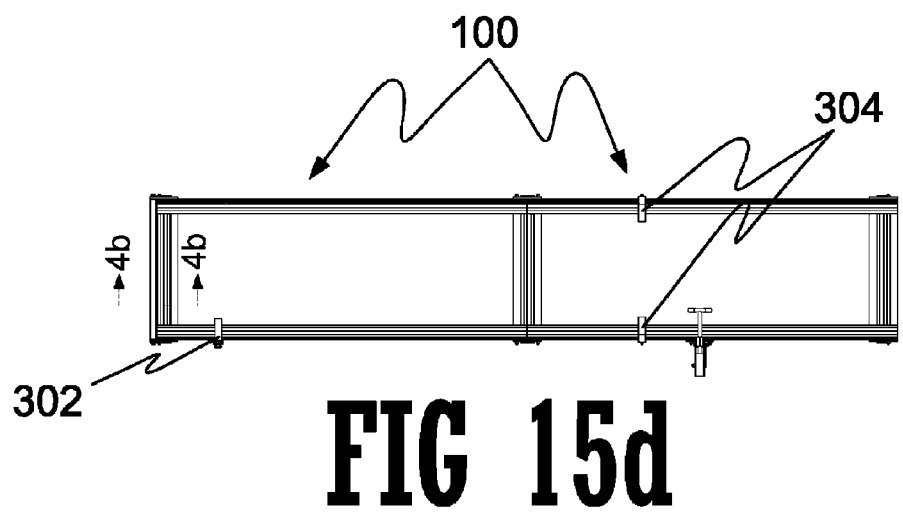
FIG. 15d is a top view of the rail assembly of the ladder mounting system.

The instant invention can be easily adapted, augmented, and modified because of the structure of the aluminum channel. The most basic elements of the aluminum channel are shown in FIG. 2 for the quad-channel embodiment and FIG. 12 for the dual-channel embodiment. The aluminum channel forms the small channels which can accept the head of the bolt 202. The embodiment of the aluminum channel shown in FIG. 12 illustrates two small channels formed on one side of the aluminum channel. The head of the bolt 202 can be slid along the length of the aluminum channel to the desired position on the aluminum channel. Further, as is illustrated in FIG. 2, the bolt 202 will not turn when a nut is applied since the small channel is only slight larger than the head of the bolt 202 precluding the bolt head from turning. The small channels are basic foundational elements of the instant invention as they permit a vast number of configurations of the aluminum channel relative to cross-members and to accessories.

The design of the instant invention allows for multiple configurations as the rail can be attached to many attachments and accessories via a bolt nut combination. In addition, the rail and punched pattern configuration may be used in a variety of applications such as with a tubular leg assembly by using a small punched pattern plate or with the "D" shaped legs with the punched patterns on the ends. Further, another embodiment is the rail accepting different accessories including, but not limited to, straps, "L" shaped restraints, ladder locks (open latch assembly), and beacon holders.

The cross-member assemblies 301 of the rail assembly are comprised of a cross-member 305, a roller assembly 306, two cross-member brace plates 304, and a punched flange. For a given cross-member assembly 301 the cross-member 305 is attached to the two cross-member brace plates 304 which are located on opposite ends of the cross-member 305. See FIG. 3. The cross-member assemblies structurally connects the two parallel aluminum channels 201 via bolts 202 placed along the aluminum channel in the small channels and bolted to the cross-member brace plate 304 via the punched flange. Nuts 303 are used to secure the assemblies to the nuts. Bolts 202 are shown securing the side flanges to rails in FIG. 5, but the nuts (not shown) are used to securely fasten the cross-member assemblies 301 to the rails. The roller assembly 306 allows for easy loading of the ladder onto the instant invention. As the ladder is loaded, the roller assembly 306 rotates and therefore permits easy loading of ladders onto a ladder rack assembly.

In a preferred embodiment of the instant invention the aluminum channels form small channels on all surfaces of the aluminum channels. Since the small channels are formed on all surfaces, bolts may be placed at any position of the length of the aluminum channel and directed outward in several directions. Since the bolts can be directed in several directions in many instances this arrangement replaces the need for a punched flange which adds to the adaptability of the instant invention.

Figure 16:
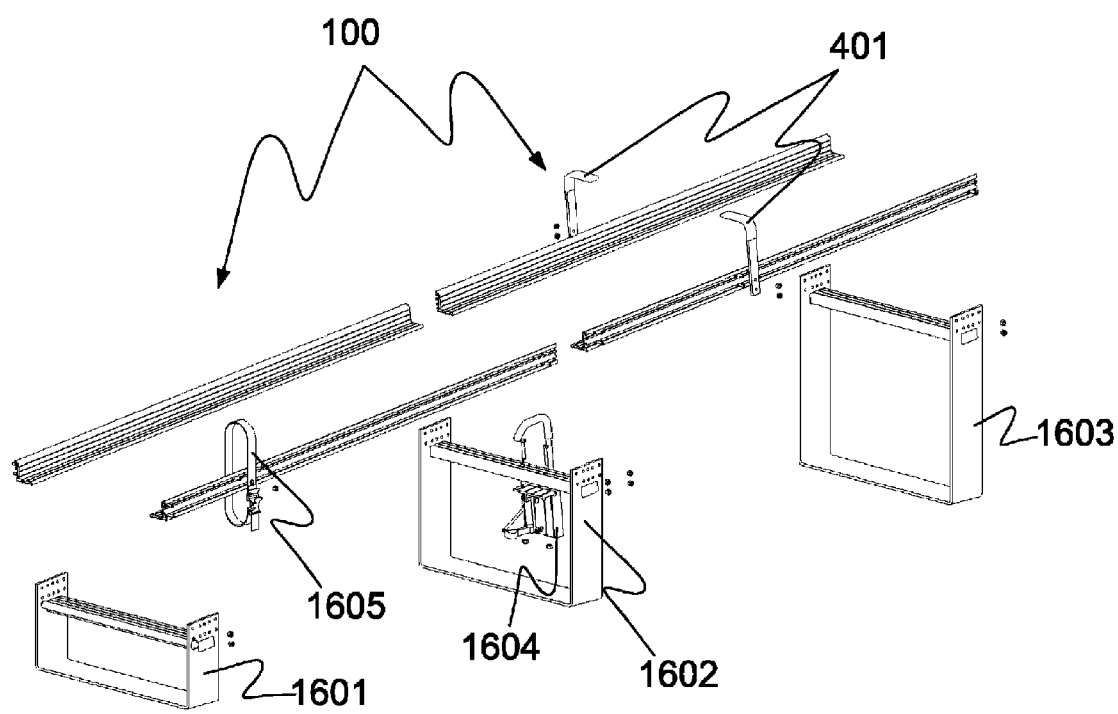
FIG. 16 is an exploded view of an embodiment of the inclined rail assembly of the ladder mounting system using a bracket support.
Figure 17:
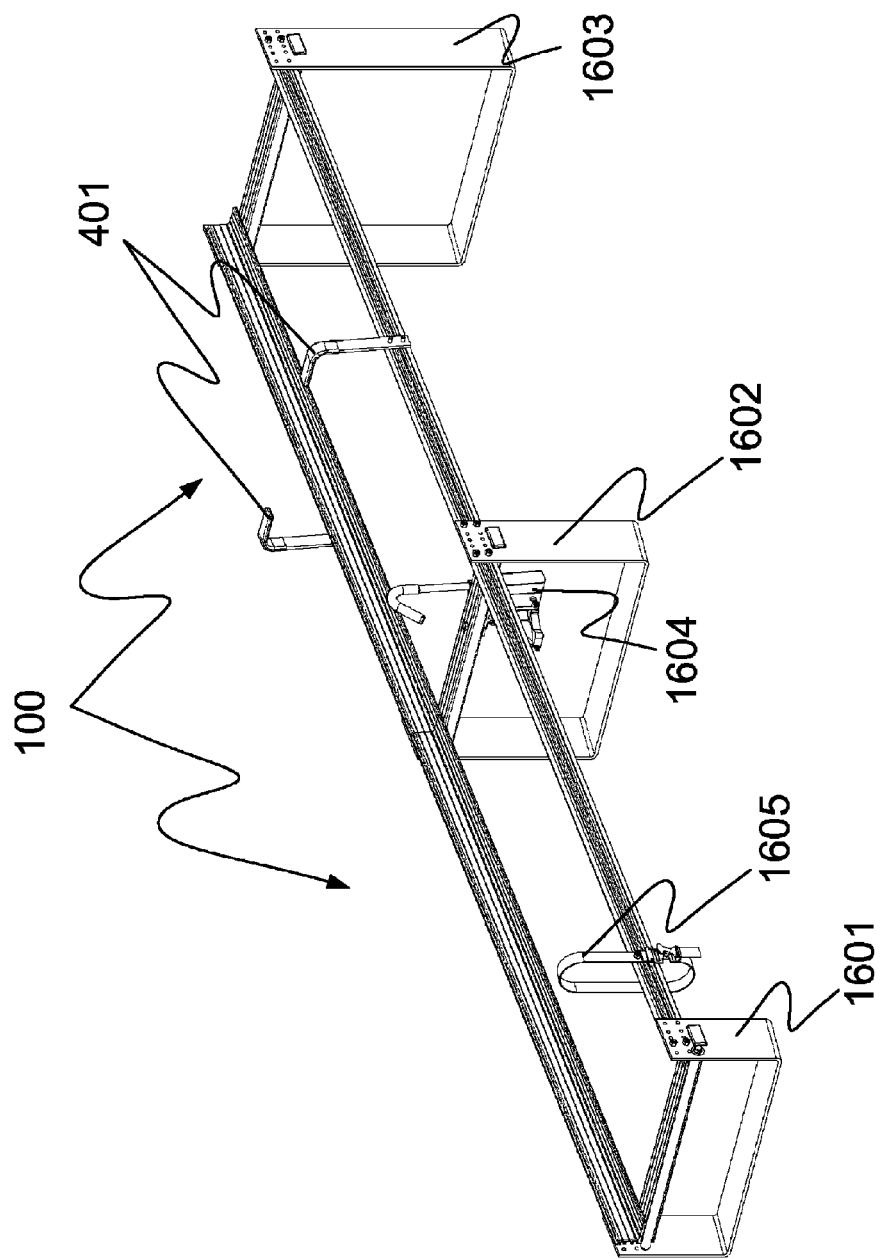
FIG. 17 is a perspective view of the inclined embodiment of the rail assembly of the ladder mounting system.

Depending on the applications and requirements of the instant invention, various configurations of support assemblies may be used. One embodiment of a support assembly is comprised of a support flange 1601 which is generally described as an essentially "D" shaped support. The support flange can be manufactured in a short length 1601, medium length 1602, and long length 1603. If an inclined ladder support system is desired, support flanges of different lengths can be used as is shown in FIG. 16 and FIG. 17.

Figure 18:
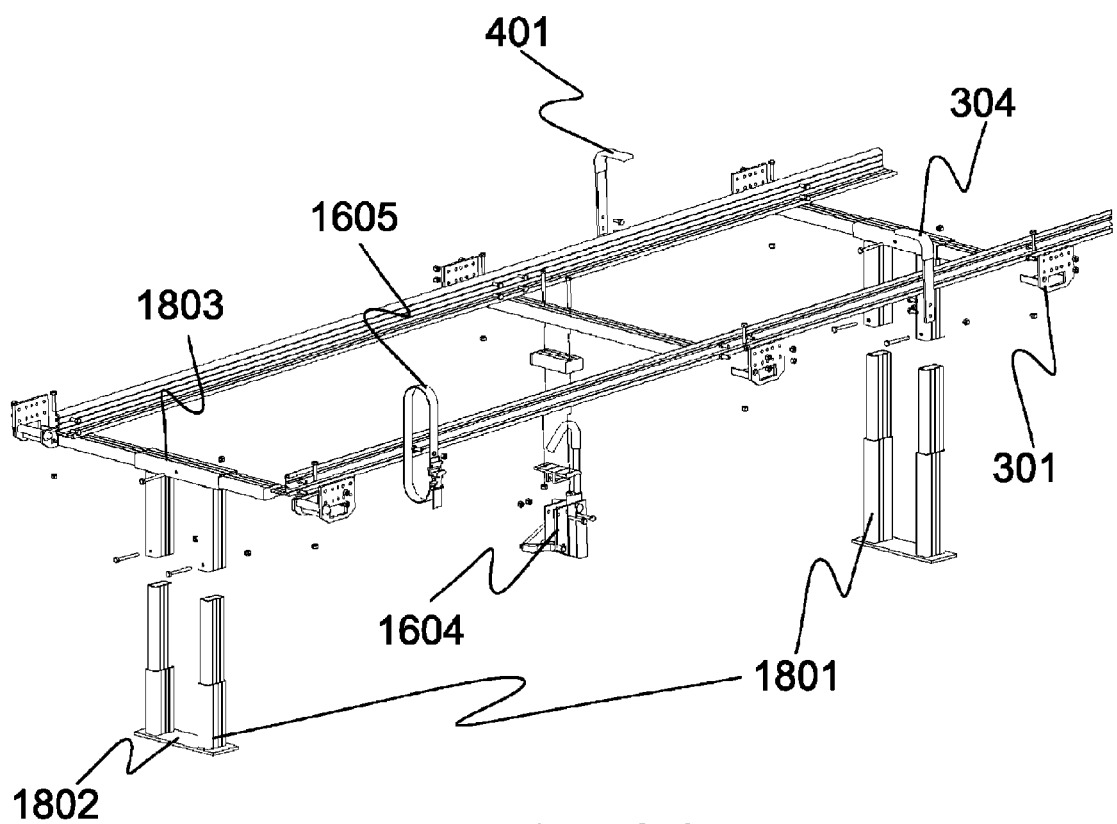
FIG. 18 is a perspective view of another embodiment of the inclined rail assembly using a dual column support.

Another embodiment of the support assembly is the dual column support 1801 system illustrated in FIG. 18. The dual column support 1801 can be used in level ladder support or an inclined support arrangement. The dual column support 1801 is essentially two vertical columns attached to a support plate 1802 at the bottom and an open top channel 1803 attached at the top. The support plate is mounted to the vehicle. The open top channel 1803 can be positioned along the cross-member assemblies 301 anywhere between the cross-member brace plate 304. The top open channel is secured by a bolt 202 placed through the open top channel into the cross-members 305.

Figure 19:
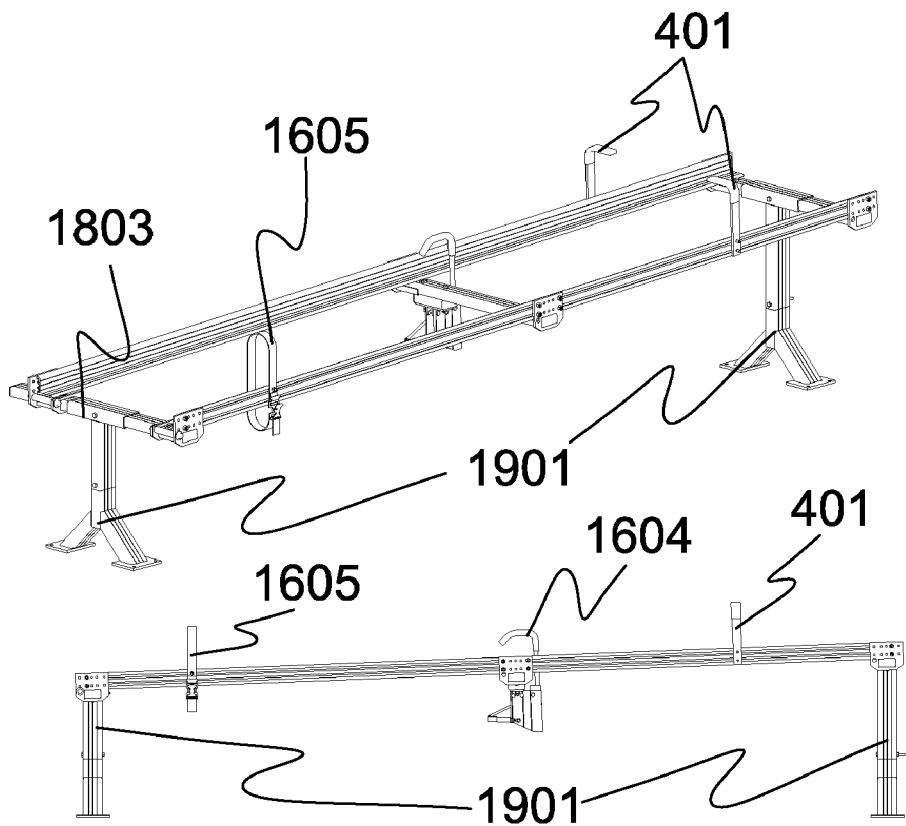
FIG. 19 is a perspective view of another embodiment of the inclined rail assembly using an inverted "Y" column support.

Another embodiment of the support assembly is the inverted "Y" column support 1901 shown in FIG. 19. The inverted "Y" column support 1901 is essentially two columns joined to form a "Y" with a single column extending upwards from at the joint as shown in FIG. 19. The inverted "Y" is attached to two support plates at the bottom and an open top channel attached at the top. The open top channel 1803 can be positioned along the cross-member assemblies 301 anywhere between the cross-member brace plate 304. The top open channel is secured by a bolt 202 placed through the open top channel into the cross-members 305.

Security assemblies are used to secure the ladder to the instant invention 100. Security assemblies are manufactured in a variety of configurations. One embodiment of a security assembly is comprised of a closed loop strap 1605. Another embodiment of a security assembly is an open latch assembly 1604. Yet another embodiment of a security assembly is a support "L" 401. The purpose of all these security assembly embodiments is to secure the ladder to the ladder rack. All of the security assemblies are attached to the ladder support using bolts installed in the small channels in the rails. For example, in FIG. 6, a pair of support "L's" 401 are attached to the rails and serve to limit the upward motion of a ladder mounted on the instant invention 100. The closed loop strap 1605 and the open latch assembly 1604 are also attached to the instant invention also using bolts installed in the small channels in the rails as is shown in FIG. 19.

Figure 20:
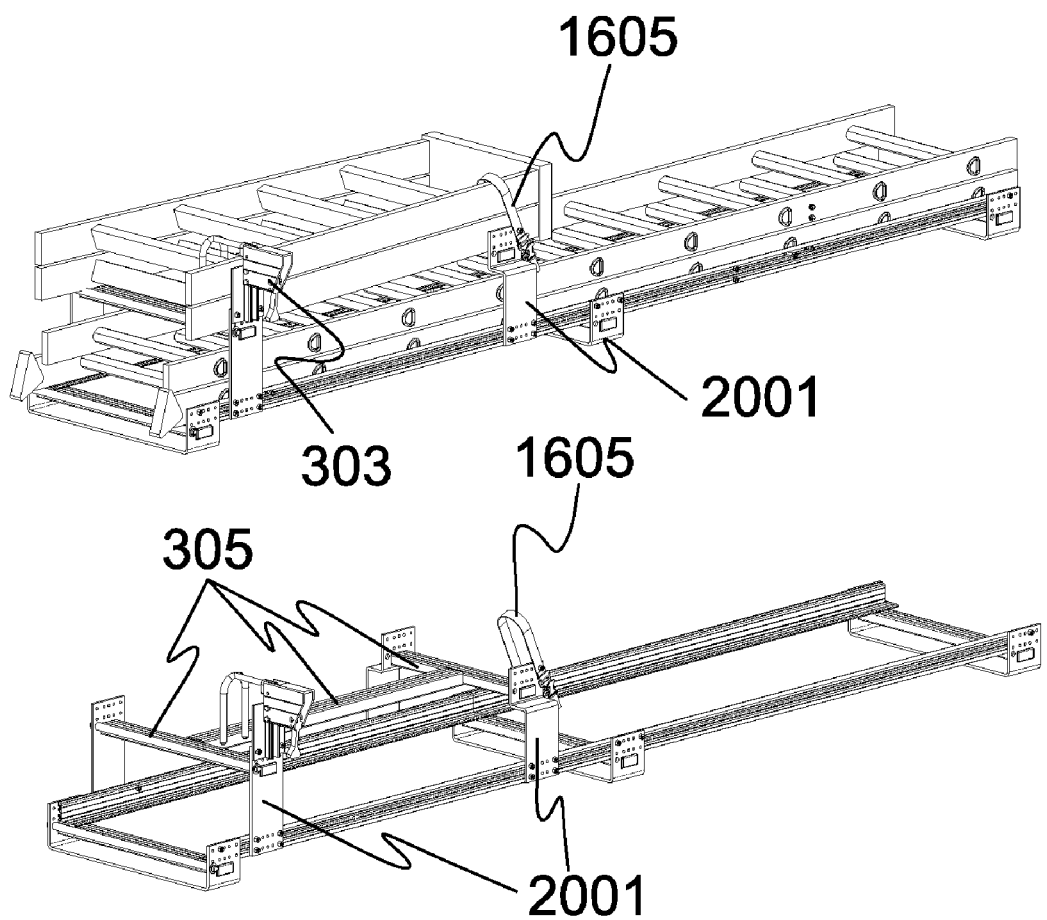
FIG. 20 is a perspective view of an embodiment of the ladder rail support system with the dual ladder configuration.
Figure 21:
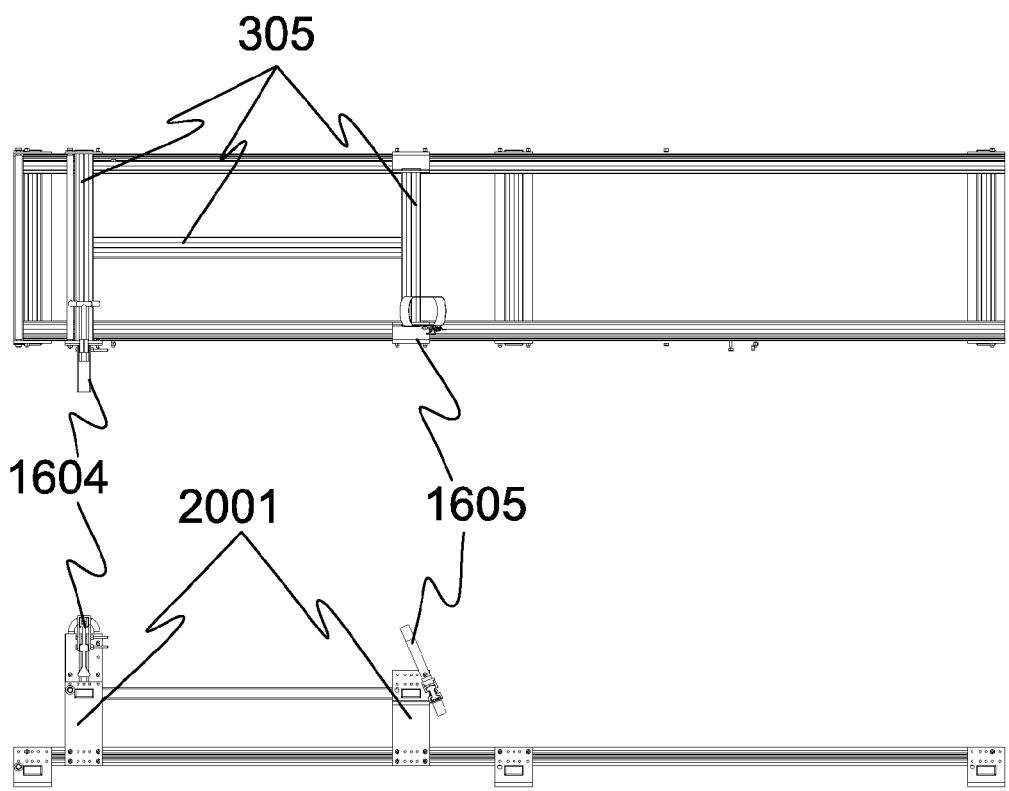
FIG. 21 is a top and side view of an embodiment of the ladder rail support system with the dual ladder configuration.

The instant invention is also comprised of assemblies that can be used to stack ladders on a vehicle as shown in FIG. 20 and FIG. 21. The stacking flanges 2001 are used to support an additional ladder rack assembly over a lower assembly.

Figure 22:
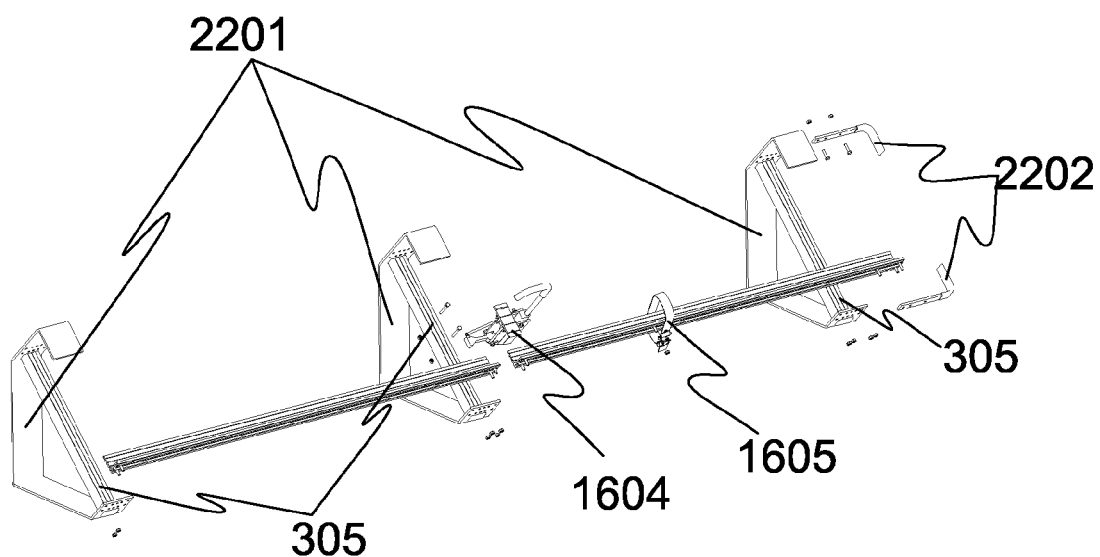
FIG. 22 is a perspective view of an embodiment of the ladder rail support system with the slanted ladder configuration.
Figure 23:
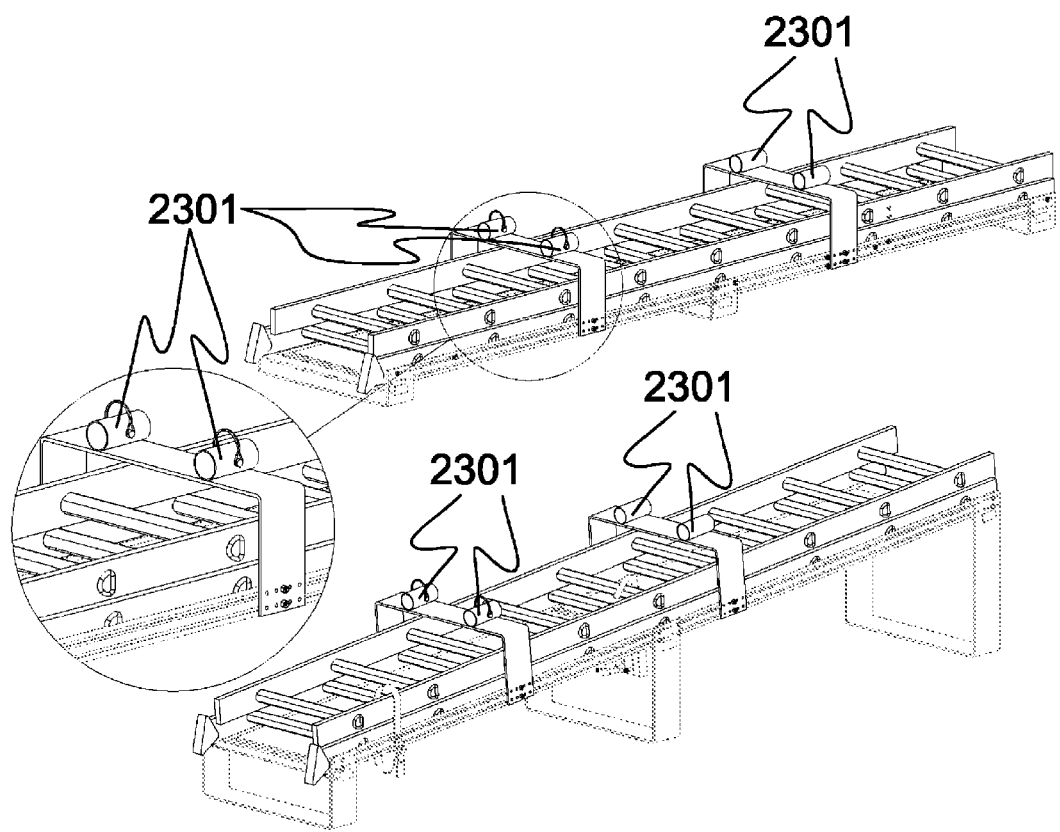
FIG. 23 is a perspective view of the inclined embodiment of the rail assembly of the ladder mounting configuration.
Figure 24A:
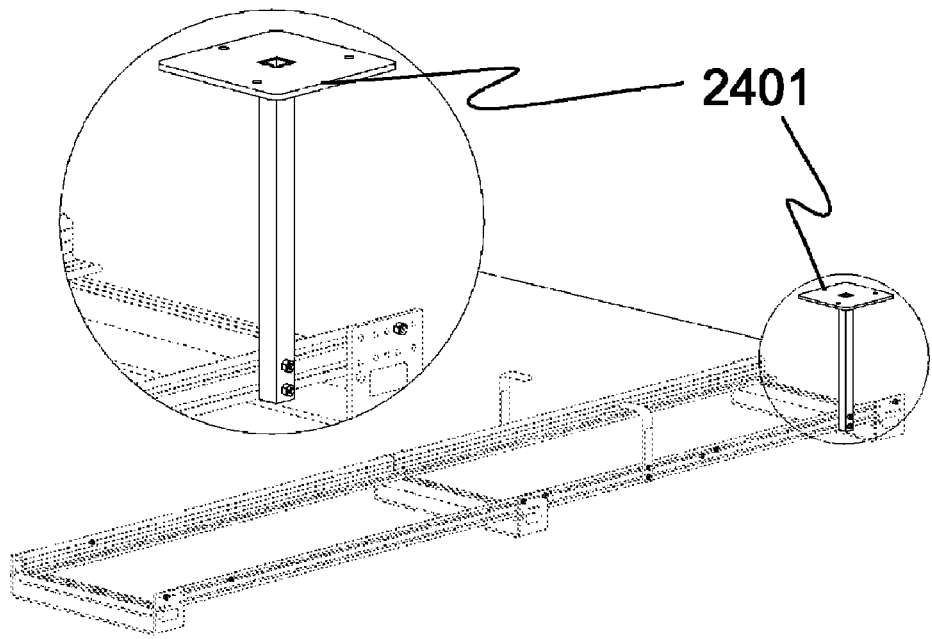
FIG. 24a is a perspective and expanded view of the ladder rail support system comprising the inclined long beacon support.
Figure 24B:
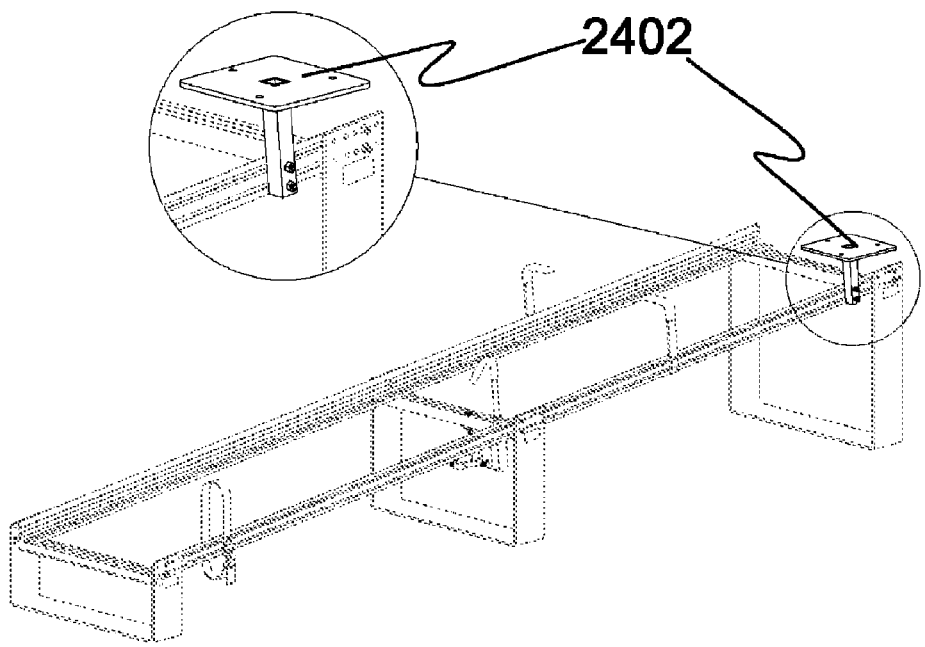
FIG. 24b is a perspective and expanded view of the ladder rail support system comprising the inclined short beacon support.

The instant invention is also comprised of an inclined ladder rack assembly shown in FIG. 22. The inclined ladder rack assembly is comprised of incline brackets 2201, end stops 2202 and a single rail. The incline brackets are comprised of essentially a "V" shaped bracket with a roller extending between the open ends of the "V." The end stops 2202 serve to prevent the ladder from extended too far past the inclined ladder assembly. Security assemblies such as the closed loop strap 1605 and the open latch assembly 1604 may be used to securely hold the ladder on the incline ladder rack.

The instant invention is also comprised of accessory attachments such as the shovel holders 2301, beacon support 2401, and inclined beacon support 2402. Accessory attachments are secured to the instant invention using the aforementioned system of bolts 202 placed in the small channels along the rails.

Figure 25:
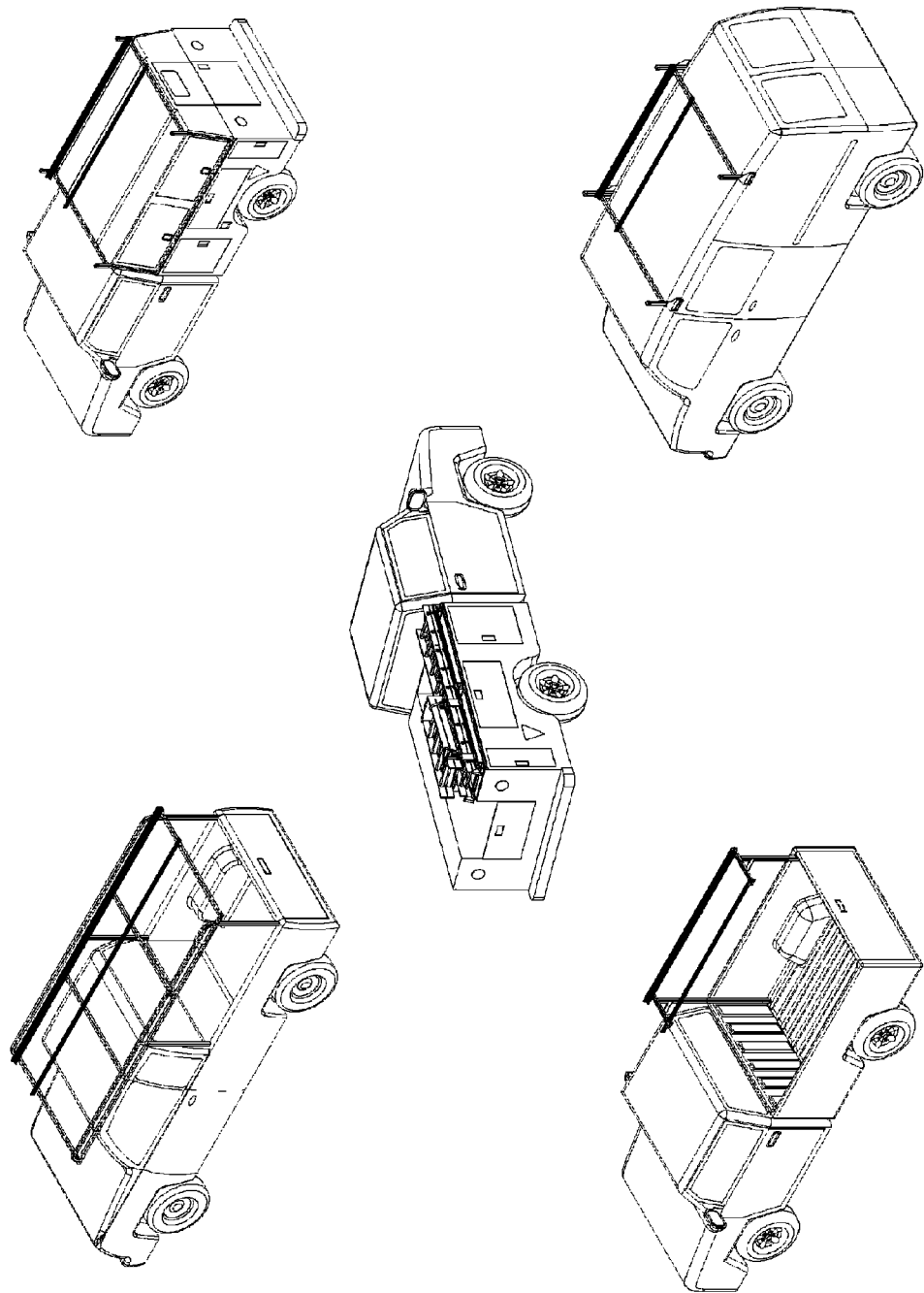
FIG. 25 is a perspective view of vehicles showing a sampling of arrangements of the ladder rack system and illustrates how the ladder rack assembly may be adapted to any manufacturer's ladder rack system and on any body-style of vehicle.

The instant invention, the ladder rack support system, is capable of being used on a wide variety of vehicle types including, but not limited to, pickup trucks, panel trucks, vans, utility trucks as illustrated in FIG. 25. The ladder rail is also capable of supporting a wide variety of objects on an equally wide variety of vehicles including, but not limited to, boats and airplanes. Any application requiring an easily constructed frame that can be attached to a variety of objects can be accommodated by the instant invention.

In the best mode of operation of the ladder support, the rail assembly, a plurality of support assemblies, one or more security assemblies, and one or more accessory assemblies are affixed to the chassis of a vehicle, by affixing the support assemblies to the vehicle chassis. Then, the ladder is placed onto the ladder support by sliding the ladder onto the ladder mounting system. The ladder is then secured to the ladder support via one of the ladder securing devices.

What is claimed is:

1. A rail assembly comprising a pair of support rails, each support rail comprised of
   a. an elongated rail with an essentially "L" shaped cross section,
   b. a plurality of t-slots formed by the elongated rail along the exterior of the "L" shape, wherein the t-slots are formed along the length of the rails, wherein the t-slots can accept the head of a bolt at the ends of the t-slot, wherein the t-slot prevents the rotation of the bolt, wherein the head of the bolt is incapable of being removed from the t-slot except at the ends of the t-slot at the ends of the ladder rail wherein there are two t-slots on each exterior wall,
   c. a plurality of t-slots formed by the elongated rail along the interior of the "L" shape, wherein the t-slots are formed along the length of the rails, wherein there is one t-slot on each interior wall, wherein the t-slots can accept UHMW slip pads, wherein the slip pads can be inserted onto a ladder rail and provide a non-stick surface that allows ladders to more easily slide along the ladder rail, wherein the interior t-slots are smaller than the exterior t-slots therefore not accepting bolt heads only UHMW slip pads;

d. two or more cross-members assemblies arranged perpendicular to the support rails and so that the support rails face each other, that is, the rails form a mirror image of each other with the lower side of each "L" pointing towards the center of the rail assembly;

e. wherein the support rails ride on the two or more cross-members assemblies;

f. wherein the two or more cross-members assemblies attach to the rails by clamping or bolting directly through the two or more cross-members assemblies;

g. one or more roller assemblies attached at one or both ends of the support rails, and h. a means to connect the cross-members to the support rails wherein cross-members connect two support rails to form a ladder mounting system.

2. A rail assembly as described in claim 1 wherein all components of the support rail are manufactured from aluminum.

3. A rail assembly as described in claim 1 comprising
a. a splice joint wherein the rails can be spliced together to form longer rails with a single splice joint
   i) wherein the splice joint is comprised of an essentially "L" shaped aluminum or steel plate formed with grooves to accept the t-slots and grooves on the rails;
   ii) wherein the splice joint is long enough to provide sufficient support by overlapping the ends of the rails to provide support,
   iii) wherein bolts are positioned along the t-slots at the appropriate location,
   iv) wherein the splice joint is positioned over the joint of two rails and the bolts secured with nuts; and
b. a cross-member bracket attached to a rail by positioning bolts in the t-slots were appropriate and securing the cross-member bracket with nuts.

4. A support rail as described in claim 1
a. wherein the cross-members assemblies are comprised of cross-members, a cross-member brace plate; a roller, and two side flanges; and
b. wherein the side flanges can be attached via a nut-and-bolt configuration or can be welded to the cross-members.

5. A rail assembly as described in claim 1
a. wherein the cross-member assemblies are comprised of a cross-member, a roller assembly, two cross-member brace plates, and a punched flange;
b. wherein the cross-member is attached to the two cross-member brace plates, which are located on opposite ends of the cross-member; and
c. wherein cross-member assemblies structurally connects the two parallel support rails via bolts placed along the exterior t-slots and bolted to the cross-member brace plate via the punched flange.

* * * * *